United States Patent
Wan et al.

(10) Patent No.: US 10,606,447 B2
(45) Date of Patent: Mar. 31, 2020

(54) METHOD AND APPARATUS FOR INTERFACE PRESENTATION, METHOD AND APPARATUS FOR USER INTERFACE INTERACTION, AND COMPUTER READABLE STORAGE MEDIUM

(71) Applicant: TENCENT TECHNOLOGY (SHENZHEN) COMPANY LIMITED, Shenzhen (CN)

(72) Inventors: Xucheng Wan, Shenzhen (CN); Sheng Yang, Shenzhen (CN); Xiao Yang, Shenzhen (CN); Shan Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 587 days.

(21) Appl. No.: 14/260,683

(22) Filed: Apr. 24, 2014

(65) Prior Publication Data
US 2014/0229900 A1    Aug. 14, 2014

Related U.S. Application Data

(63) Continuation of application No. PCT/CN2014/070288, filed on Jan. 8, 2014.

(30) Foreign Application Priority Data

Jan. 17, 2013  (CN) .......................... 2013 1 0017466

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 9/451* (2018.02); *G06Q 30/0234* (2013.01)

(58) Field of Classification Search
CPC .... G06F 3/0482; G06F 9/4443; G06F 3/0236; G06F 9/451; G06F 3/04815;
(Continued)

(56) References Cited

U.S. PATENT DOCUMENTS 6,266,098 B1 * 7/2001 Cove .................. H04N 5/44513
                                                    348/563
6,938,218 B1 * 8/2005 Rosen ................. G06F 3/04815
                                                    345/419

(Continued)

FOREIGN PATENT DOCUMENTS

CN    101644985    2/2010
CN    101957719    1/2011
(Continued)

OTHER PUBLICATIONS

Tencent Technology (Shenzhen) Company Limited; PCT/CN2014/070288 filed on Jan. 8, 2014; International Search Report on Patentability; dated Apr. 22, 2014; The State Intellectual Property Office of the P.R. China(ISA/CN); 12 pages.

(Continued)

*Primary Examiner* — Mahelet Shiberou
(74) *Attorney, Agent, or Firm* — Brinks Gilson & Lione (57) ABSTRACT

A method and apparatus for interface presentation, a method and apparatus for user interface interaction, and a computer readable storage medium are proposed. The method for interface presentation includes determining a logic relationship between a main interface to be presented and respective sub-interfaces according to functionality; constructing a multiple-face structure according to the logic relationship, wherein each face of the multiple-face structure corresponds (Continued)

to an interface, and, when an interface has a sub-interface, the interface is adjacent to each sub-interface thereof; presenting the main interface in the multiple-face structure; and, after detecting that function of one sub-interface is triggered, determining every sub-interface from the one sub-interface to the main interface according to the logic relationship in the multiple-face structure and presenting the every sub-interface. The present disclosure achieves an effect of the associated presentation of multiple interfaces, reduces the complexity of interface operations, and enhances the usability.

21 Claims, 7 Drawing Sheets

(51) Int. Cl.
*G06F 9/451* (2018.01)
*G06Q 30/02* (2012.01)

(58) Field of Classification Search
CPC .. H04N 5/44543; H04N 21/482; H04N 13/00; G06Q 30/0234; H04M 1/72583
USPC ......................................................... 715/841
See application file for complete search history.

(56) References Cited

U.S. PATENT DOCUMENTS

| | | | | |
|---|---|---|---|---|
| 7,246,329 B1* | 7/2007 | Miura | ................... | G06F 3/0482 715/764 |
| 7,996,788 B2* | 8/2011 | Carmichael | ........... | G06F 3/0482 715/834 |
| 8,943,442 B1* | 1/2015 | Oberheu | ............... | G06F 3/0482 715/810 |
| 2003/0156146 A1 | 8/2003 | Suomela et al. | | |
| 2004/0207666 A1* | 10/2004 | Hally | ................. | G06F 3/04842 715/854 |
| 2005/0050476 A1* | 3/2005 | SanGiovanni | ........ | G06F 3/0233 715/834 |
| 2006/0020898 A1* | 1/2006 | Kim | .................... | G06F 3/04815 715/764 |
| 2007/0136681 A1* | 6/2007 | Miller | ................. | G06F 3/04817 715/782 |
| 2007/0168886 A1* | 7/2007 | Hally | ................. | G06F 3/04842 715/854 |
| 2007/0261001 A1* | 11/2007 | Nagiyama | ............. | G06F 3/0482 715/810 |
| 2008/0261660 A1* | 10/2008 | Huh | .................... | G06F 3/04815 455/566 |
| 2009/0183100 A1* | 7/2009 | Eom | ..................... | G06F 3/0482 715/769 |
| 2009/0228832 A1* | 9/2009 | Cheng | .................. | G06F 3/0482 715/810 |
| 2010/0248787 A1* | 9/2010 | Smuga | ................. | G06F 3/0482 455/566 |
| 2010/0315417 A1* | 12/2010 | Cho | ...................... | G06F 1/1616 345/419 |
| 2011/0055760 A1* | 3/2011 | Drayton | ............... | G06F 3/0482 715/834 |
| 2011/0195723 A1* | 8/2011 | Kim | .................. | H04M 1/72544 455/456.1 |
| 2012/0013557 A1 | 1/2012 | Lee et al. | | |
| 2012/0047462 A1* | 2/2012 | Moon | ...................... | H04N 5/45 715/810 |
| 2012/0260217 A1* | 10/2012 | Celebisoy | ........... | G06F 3/04815 715/836 |
| 2013/0145322 A1* | 6/2013 | Hendricks | ............. | G06F 3/0482 715/834 |
| 2015/0317058 A1* | 11/2015 | Babarykin | .......... | G06F 3/04815 715/765 |

FOREIGN PATENT DOCUMENTS

| | | |
|---|---|---|
| CN | 101978346 | 2/2011 |
| CN | 102236720 | 11/2011 |
| CN | 102339210 | 2/2012 |
| CN | 102365615 | 2/2012 |

OTHER PUBLICATIONS

English Abstract of Chinese Patent Application No. 102236720 A; 1 page.
English Abstract of Chinese Patent Application No. 102339210 A; 2 pages.
English Abstract of Chinese Patent Application No. 101644985 A; 1 page.
CN102365615, Published Feb. 29, 2012, Abstract only in English (1 page).
CN101978346, Published Feb. 16, 2011, Abstract only in English (1 page).
CN101957719, Published Jan. 26, 2011, Abstract only in English (1 page).
China Office Action dated Sep. 1, 2017 in related application No. 201310017466.8 filed Jan. 17, 2013 2013 (11 pages).
China Office Action dated Sep. 1, 2017 in related application No. 201310017466.8 filed Jan. 17, 2013, Relevant Documents Section Only in English (1 page).

* cited by examiner

METHOD AND APPARATUS FOR INTERFACE PRESENTATION, METHOD AND APPARATUS FOR USER INTERFACE INTERACTION, AND COMPUTER READABLE STORAGE MEDIUM

CROSS-REFERENCES TO RELATED APPLICATIONS

This application is a continuation of International Patent Application No. PCT/CN2014/070288, entitled "Method and Apparatus for Interface Presentation, Method and Apparatus for User Interface Interaction, and Computer Readable Storage Medium," filed on Jan. 8, 2014, which claims the priority benefit of Chinese Patent Application No. 201310017466.8, entitled "Method and Apparatus for Interface Presentation, Method and Apparatus for User Interface Interaction," filed on Jan. 17, 2013, the disclosures of which are herein incorporated by reference in their entireties.

TECHNICAL FIELD

The present disclosure relates to the field of electronic device technology, and particularly to a method and apparatus for interface presentation, a method and apparatus for user interface interaction, and a computer readable storage medium.

BACKGROUND

A complete product often has multiple functions, satisfies different functional requirements, and the needs corresponding to function interfaces. Presently, a common practice is to aggregate all of the function interfaces into one fixed framework, whereby the main function is presented on a default interface, i.e., a home page, while other function interfaces are presented solely by the switching of function menus.

However, the above solution cannot be realized in one interface, namely where parallel tasks and multiple scenarios are triggered simultaneously, and a user needs to switch function menus back and forth to implement the tasks, resulting in operations that are cumbersome and inconvenient to use.

SUMMARY OF THE DISCLOSURE

In order to reduce the complexity of interface operations, the present disclosure provides a method and apparatus for interface presentation, a method and apparatus for user interface interaction, and a computer readable storage medium.

In a first aspect, the present disclosure provides a method for interface presentation, including determining a logic relationship between a main interface to be presented and respective sub-interfaces according to functionality; constructing a multiple-face structure according to the logic relationship, wherein each face of the multiple-face structure corresponds to an interface, and, when the interface has a sub-interface, the interface is adjacent to each sub-interface thereof; presenting the main interface in the multiple-face structure; and, after detecting that function of one sub-interface is triggered, determining every sub-interface from the one sub-interface to the main interface according to the logic relationship in the multiple-face structure and presenting the every sub-interface.

In a further aspect, the present disclosure provides a method for user interface interaction, including initiating a request to present one sub-interface when a main interface in a multiple-face structure has been represented; determining every sub-interface from the one sub-interface to the main interface according to a logic relationship between the main interface and respective sub-interfaces, and presenting the every sub-interface; initiating a request to present a sub-interface B of a certain sub-interface A; and presenting the sub-interface B beside the sub-interface A according to an adjacency order of interfaces of the multiple-face structure. The multiple-face structure is constructed in a manner of determining the logic relationship between the main interface and respective sub-interfaces according to functionality; and constructing the multiple-face structure according to the logic relationship, wherein each face of the multiple-face structure corresponds to an interface, and, when the interface has a sub-interface, the interface is adjacent to each sub-interface thereof.

In another aspect, the present disclosure provides an apparatus for interface presentation, including a construction module configured to determine a logic relationship between a main interface to be presented and respective sub-interfaces according to functionality, and to construct a multiple-face structure according to the logic relationship, wherein each face of the multiple-face structure corresponds to an interface, and, when the interface has a sub-interface, the interface is adjacent to each sub-interface thereof; and a presentation module configured to present the main interface in the multiple-face structure, and to determining, after detecting that function of one sub-interface is triggered, every sub-interface from the one sub-interface to the main interface according to the logic relationship in the multiple-face structure and present the every sub-interface.

In a further aspect, the present disclosure provides an apparatus for user interface interaction, including a first request module configured to initiate a request to present one sub-interface when a main interface in a multiple-face structure has been represented; a first presentation module configured to determine every sub-interface from the one sub-interface to the main interface according to a logic relationship between the main interface and respective sub-interfaces and to present the every sub-interface; a second request module configured to initiate a request to present a sub-interface B of a certain sub-interface A; and a second presentation module configured to present the sub-interface B beside the sub-interface A according to an adjacency order of interfaces in the multiple-face structure. The multiple-face structure is constructed in a manner of determining the logic relationship between the main interface and respective sub-interfaces according to functionality; and constructing the multiple-face structure according to the logic relationship, wherein each face of the multiple-face structure corresponds to an interface, and, when the interface has a sub-interface, the interface is adjacent to each sub-interface thereof.

In yet a further aspect, the present disclosure provides a computer readable storage medium having stored thereon a computer program containing a program code which, when executed on a computing device, performs respective steps of the method for interface presentation as described above or respective steps of the method for user interface interaction as described above.

The technical solutions provided by the present disclosure bring about the beneficial effects as follows. An effect of the associated presentation of multiple interfaces can be achieved. The logical association between respective interfaces is reflected, which is more intuitive and can satisfy the requirement of a multiple-task scenario. For a scenario of parallel tasks, there is no need to switch function menus frequently; thereby the complexity of interface operations is reduced greatly, the effect of interface presentation and the interface utilization are improved, and the usability is enhanced.

BRIEF DESCRIPTION OF THE DRAWINGS

In order to explain technical solutions in embodiments of the present disclosure more clearly, simple introduction of attached drawings used in the description of embodiments will be given below. Apparently, the attached drawings in the description below are only some embodiments of the present disclosure. For those ordinarily skilled in the art, other attached drawings can be obtained according to these attached drawings without inventive efforts.

DETAILED DESCRIPTION

In order to make the object, technical solutions and advantages of the present disclosure more clear, a further detailed description of implementations of the present disclosure will be made in conjunction with attached drawings below.

(First Embodiment)

Figure 1:
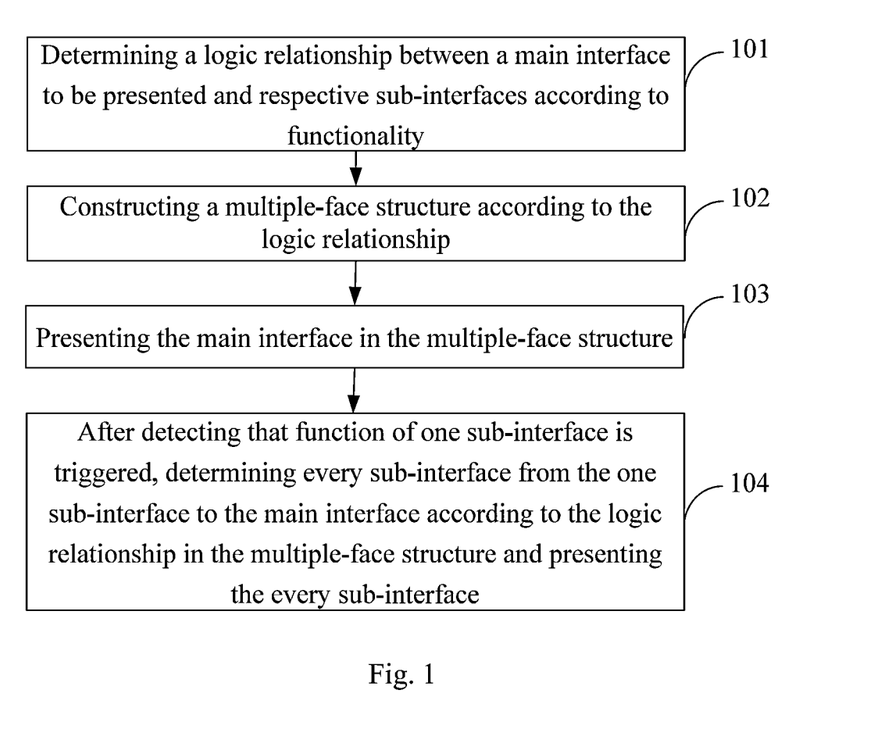
FIG. 1 is a flowchart of a method for interface presentation provided in an embodiment of the present disclosure.

Referring to FIG. 1, the present embodiment provides a method for interface presentation, which includes a step 101 of determining a logic relationship between a main interface to be presented and respective sub-interfaces according to functionality; a step 102 of constructing a multiple-face structure according to the logic relationship, wherein each face of the multiple-face structure corresponds to an interface, and, when the interface has a sub-interface, the interface is adjacent to each sub-interface thereof; a step 103 of presenting the main interface in the multiple-face structure; and a step 104 of, after detecting that function of one sub-interface is triggered, determining every sub-interface from the one sub-interface to the main interface according to the logic relationship in the multiple-face structure and presenting the every sub-interface.

In the present disclosure, the above multiple-face structure refers to a structure of any shape composed of multiple faces. The multiple-face structure may be, but is not limited to, a closed polyhedron structure. The only requirement is that each face of the multiple-face structure corresponds to an interface, and, that when the interface has a sub-interface, the interface is adjacent to each sub-interface thereof.

Further, in the present disclosure, the logic relationship represents a master-slave relationship between respective interfaces. Thus, every sub-interface from one sub-interface to the main interface can be determined, according to the logic relationship, and, according to the logic relationship, a corresponding multiple-face structure can be constructed by following the rule that each of the faces of the multiple-face structure corresponds to one interface, and, when an interface has a sub-interface, the interface is adjacent to each sub-interface thereof. The construction of the multiple-face structure will be further described specifically by way of example in the embodiments below.

In one implementation, presenting the every sub-interface includes a step of animatedly presenting the every sub-interface level by level according to an adjacency order of interfaces in the multiple-face structure, by starting from a first sub-interface adjacent to the main interface.

In another implementation, the method further includes a step of presenting a closing hot region around a sub-interface of an end level, and animatedly closing a certain sub-interface when the closing hot region of the certain sub-interface is triggered.

In the present disclosure, the closing hot region refers to a trigger region for triggering a closing function, and an operation of closing an interface is performed when the closing hot region is triggered by a user. The closing hot region may be of many forms including, but not limited to, buttons and so on. A specific manner for presenting and closing an interface may for example refer to the specific description with respect to FIG. 10; however, manners of presenting and closing an interface in the present disclosure are not limited to the manner of FIG. 10.

In another implementation, the method further includes a step of, after detecting that the function of a sub-interface B of a certain sub-interface A among the presented every sub-interface is triggered, presenting the sub-interface B beside the sub-interface A according to the adjacency order of interfaces in the multiple-face structure.

In a further implementation, detecting that function of one sub-interface is triggered includes at least one of detecting that the function of a certain sub-interface is triggered on the main interface; detecting that the function of a certain sub-interface is triggered on a tray region; detecting that the function of a certain sub-interface is triggered in a right key menu; and detecting that the function of a certain sub-interface is triggered in a message box.

In the present embodiment, the multiple-face structure may include a regular hexahedron or a polyhedron with more faces than a regular hexahedron. However, as described above, the multiple-face structure herein is not limited to polyhedrons.

The above method provided in the present embodiment determines a logic relationship between a main interface to be presented and respective sub-interfaces according to functionality, constructs a multiple-face structure according to the logic relationship, presents the main interface of the multiple-face structure, and, after detecting that the function of one sub-interface is triggered, determines every sub-interface from the one sub-interface to the main interface according to the logic relationship in the multiple-face structure and presents the every sub-interface. Thus, an effect of the associated presentation of multiple interfaces is achieved, and the logical association between respective interfaces is reflected, which is more intuitive and can satisfy the requirement of a multiple-task scenario. For a scenario of parallel tasks, there is no need to switch function menus frequently; thereby the complexity of interface operations is reduced greatly, the effect of interface presentation and the interface utilization are improved, and the usability is enhanced.

(Second Embodiment)

Figure 2:
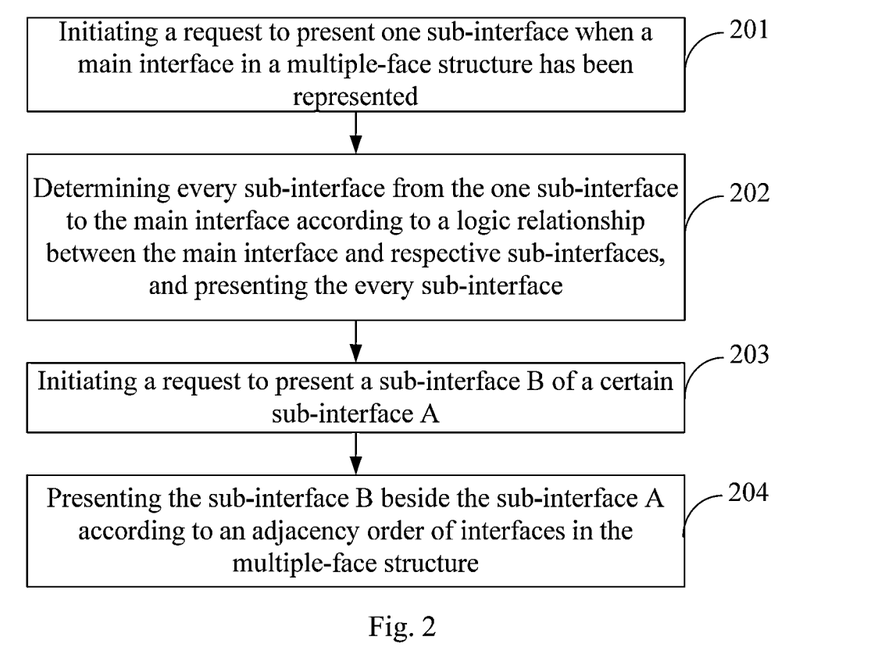
FIG. 2 is a flowchart of a method for user interface interaction provided in another embodiment of the present disclosure.

Referring to FIG. 2, the present embodiment provides a method for user interface interaction, which includes a step 201 of initiating a request to present one sub-interface when a main interface in a multiple-face structure has been represented; a step 202 of determining every sub-interface from the one sub-interface to the main interface, according to a logic relationship between the main interface and respective sub-interfaces, and presenting the every sub-interface; a step 203 of initiating a request to present a sub-interface B of a certain sub-interface A; a step 204 of presenting the sub-interface B beside the sub-interface A, according to an adjacency order of interfaces of the multiple-face structure.

The multiple-face structure is constructed in a manner of determining the logic relationship between the main interface and respective sub-interfaces according to functionality, and constructing the multiple-face structure according to the logic relationship, wherein each face of the multiple-face structure corresponds to an interface, and, when the interface has a sub-interface, the interface is adjacent to each sub-interface thereof.

It should be noted that the request in the present embodiment may be initiated by a user or various functional units in an electronic device, for example, another application of the electronic device can initiate such a request.

In one implementation, said presenting the every sub-interface includes a step of animatedly presenting the every sub-interface level by level according to the adjacency order of interfaces in the multiple-face structure, by starting from a first sub-interface adjacent to the main interface.

In another implementation, the method further includes a step of triggering a closing hot region presented around a sub-interface of an end level, and animatedly closing the sub-interface.

In a further implementation, said initiating a request to present one sub-interface or initiating a request to present a sub-interface B of a certain sub-interface A includes at least one of triggering a request for the function of a certain sub-interface on the main interface; triggering a request for the function of a certain sub-interface on a tray region; triggering a request for the function of a certain sub-interface in a right key menu; and triggering a request for the function of a certain sub-interface in a message box.

In the present embodiment, the multiple-face structure may include a regular hexahedron or a polyhedron with more faces than a regular hexahedron.

The above method provided in the present embodiment initiates a request to present one sub-interface when a main interface in a multiple-face structure has been represented; determines every sub-interface from the one sub-interface to the main interface according to a logic relationship between the main interface and respective sub-interfaces, and presenting the every sub-interface; initiates a request to present a sub-interface B of a certain sub-interface A; and presents the sub-interface B beside the sub-interface A according to an adjacency order of interfaces of the multiple-face structure. An effect of the associated presentation of multiple interfaces is achieved, and the logical association between respective interfaces is reflected, which is more intuitive and can satisfy the requirement of a multiple-task scenario. For a scenario of parallel tasks, there is no need to switch function menus frequently; thereby the complexity of interface operations is reduced greatly, the effect of interface presentation and the interface utilization are improved, and the usability is enhanced.

(Third Embodiment)

Figure 3:
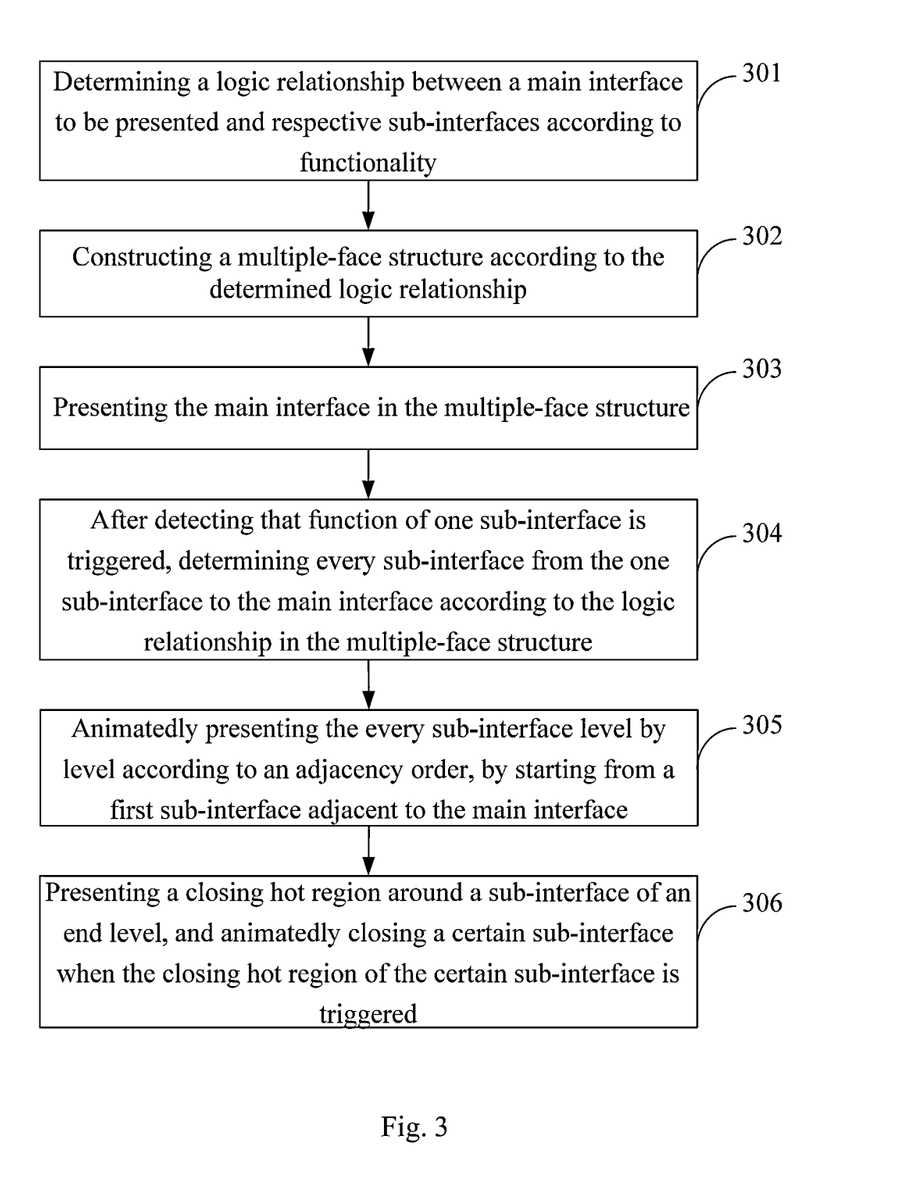
FIG. 3 is a flowchart of a method for interface presentation in yet another embodiment of the present disclosure.

Referring to FIG. 3, the present embodiment provides a method for interface presentation, which includes the following steps 301-306.

At step 301, a logic relationship between a main interface to be presented and respective sub-interfaces is determined according to functionality.

In the present embodiment, the main interface and respective sub-interfaces can be divided hierarchically according to functionality. For example, referring to FIG. 4, the interface of the first level is an interface a, which is the main interface. Below the main interface a, there are divided five interfaces of the second level, including an interface b1, an interface b2, an interface b3, an interface b4, and an interface b5. Below the interface b1, there are further divided three interfaces of the third level, including an interface c1, an interface c2, and an interface c3. Further, similarly, there may be divided interfaces of up to the N-th level, including an interface n1, an interface n2, and an interface n3, and so on.

At step 302, a multiple-face structure is constructed according to the determined logic relationship, wherein each face of the multiple-face structure corresponds to an interface, and, when the interface has a sub-interface, the interface is adjacent to each sub-interface thereof.

Figure 4:
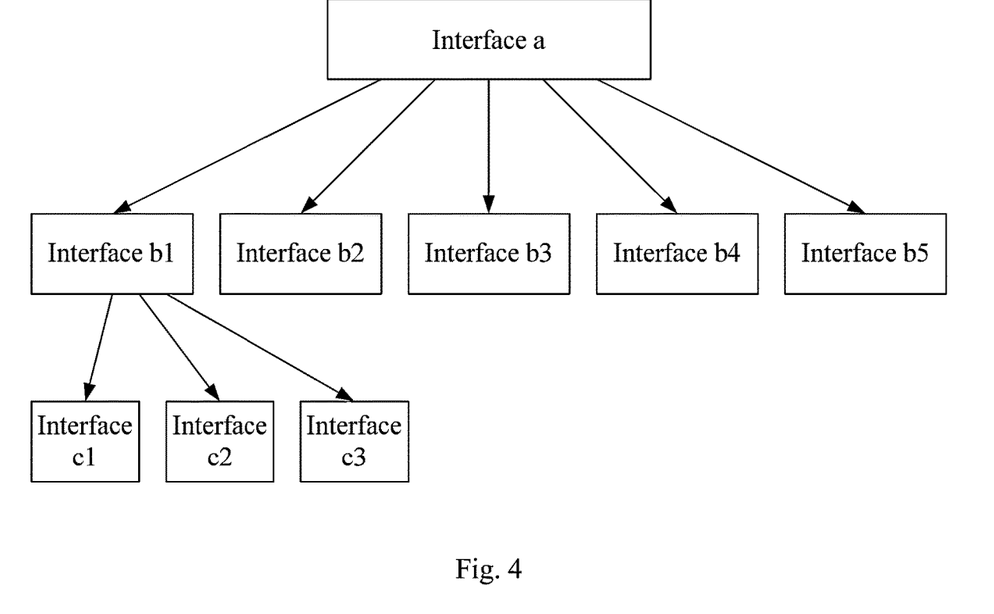
FIG. 4 is a first schematic diagram of the logic relationship of interfaces in the yet another embodiment of the present disclosure.

Taking the logic relationship of FIG. 4 as an example, a nine-face structure can be obtained according to the interface a, the interface b1, the interface b2, the interface b3, the interface b4, the interface b5, the interface c1, the interface c2 and the interface c3. The interface a is adjacent respectively to five interfaces, that is, the interface b1, the interface b2, the interface b3, the interface b4 and the interface b5. The interface b1 is adjacent respectively to three interfaces, that is, the interface c1, the interface c2, and the interface c3.

In the present disclosure, the multiple-face structure can be a hexahedron, a heptahedron, an octahedron, an enneahedron, a decahedron, a hendecahedron, a dodecahedron, and a polyhedron with more faces, or can be a non-closed multiple-face structure.

At step 303, the main interface in the multiple-face structure is presented.

At step 304, after it is detected that function of one sub-interface is triggered, every sub-interface from the one sub-interface to the main interface is determined according to the logic relationship in the multiple-face structure.

In the present embodiment, detecting that function of one sub-interface is triggered includes at least one of detecting that the function of a certain sub-interface is triggered on the main interface; detecting that the function of a certain sub-interface is triggered on a tray region; detecting that the function of a certain sub-interface is triggered in a right key menu; and detecting that the function of a certain sub-interface is triggered in a message box.

Preferably, the main interface may maintain a function entry for a sub-interface, through which a corresponding sub-interface can be triggered. This way is more direct and easier to operate.

Of course, the present disclosure also provides other possible implementations. In one way, it can be detected on a tray region that the function of a certain sub-interface is triggered. The tray region refers to a taskbar notification region of the system. Generally, applications currently running in the system, the network connection, a volume control icon, the time and date, icons defined by the user himself and so on are displayed in the tray region. For notebook computers, tablet computers etc., the battery usage and so on may also be displayed. The specific ways of detecting whether the function of a certain sub-interface is triggered or not on the tray region is not limited. For example, it can be detected whether a click event, a mouse over event or the like occurs or not on a sub-interface icon. In another way, it can be detected whether the function of an interface is triggered or not in a right key menu (a tray menu). In a further way, it can also be detected whether the function of an interface is triggered or not in a message box. The message box refers to tips, which are usually displayed on the lower right corner of a screen to prompt some timely messages to the user.

At step 305, starting from the first sub-interface adjacent to the main interface, the every sub-interface is animatedly presented level by level according to the adjacency order.

The adjacency order refers to the adjacency order between respective faces in the multiple-face structure. The specific way of the animatedly presenting is not limited. For example, a sub-interface being opened can be presented with the effect of appearing from far to near, from small to big, from weak to strong, or the like. Between a sub-interface being opened and an interface having been opened, an effect can be presented that two adjacent faces of the polyhedron are opened into one plane to be presented in a tiled manner, or the like. This is not limited by the present disclosure.

Figure 5:
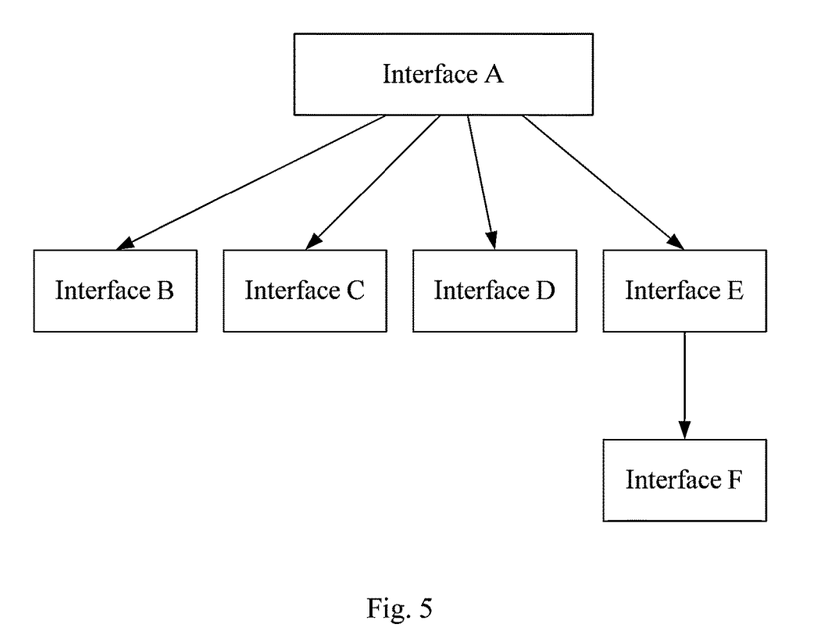
FIG. 5 is a second schematic diagram of the logic relationship of interfaces in the yet another embodiment of the present disclosure.
Figure 6:
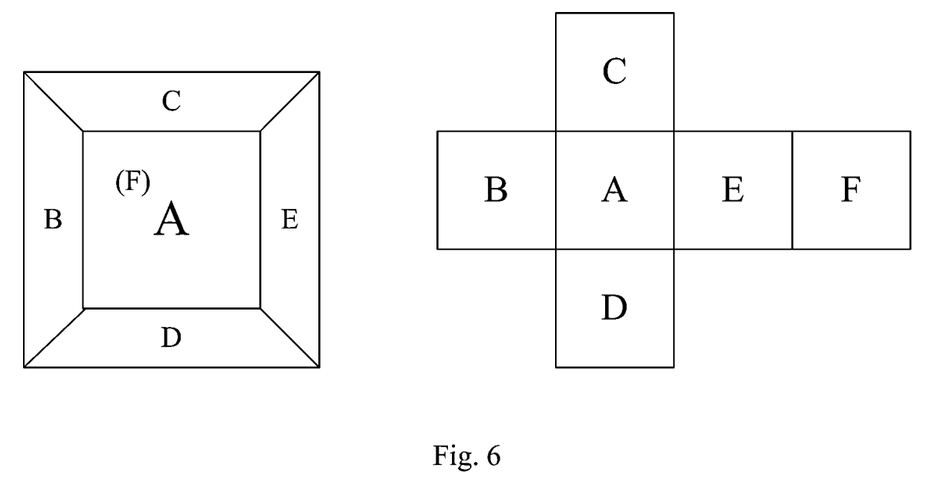
FIG. 6 is a schematic diagram of a cubic structure constructed according to the logic relationship shown in FIG. 5.

In one application scenario of the present embodiment, the multiple-face structure is a cube. Referring to FIG. 5, the specific description is made by taking three levels, which include six interfaces in total, as an example. The first level is the main interface A, which includes four sub-interfaces of the second level, that is, an interface B, an interface C, an interface D and an interface E. The interface E further includes one sub-interface of the third level, that is, an interface F. As shown in FIG. 6, a cubic structure can be obtained by constructing a multiple-face structure according to the above logic relationship. On the left side of FIG. 6 is a structural diagram of the cube, in which the top face is the interface A, the four side faces are the interface B, the interface C, the interface D and the interface E, and the bottom face is the interface F. On the right side of FIG. 6 is a schematic plane view of the cube after being unfolded, in which the interface A is adjacent to the four sub-interfaces thereof, that is, the interface B, the interface C, the interface D and the interface E, while the interface E is adjacent to the one sub-interface thereof, that is, the interface F.

Figure 7:
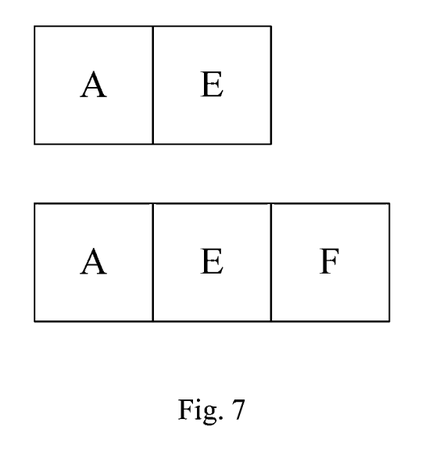
FIG. 7 is a schematic diagram of unfolding of the cubic structure shown in FIG. 6.

In the present embodiment, starting from the first sub-interface adjacent to the main interface, the determined sub-interface is animatedly presented level by level according to the adjacency order; thereby an effect that the main interface and sub-interfaces are presented simultaneously can be achieved, the association of multiple interfaces is highlighted, and the presentation is more intuitive. For example, referring to FIG. 7, after the function of the sub-interface E in the cubic structure shown in FIG. 6 is triggered, the main interface A and the sub-interface E are presented together, and, after the function of the sub-interface F in the cubic structure shown in FIG. 6 is triggered, the main interface A, the sub-interface E and the sub-interface F are presented together. Thus, an effect of simultaneously presenting multiple interfaces is achieved.

Figure 8:
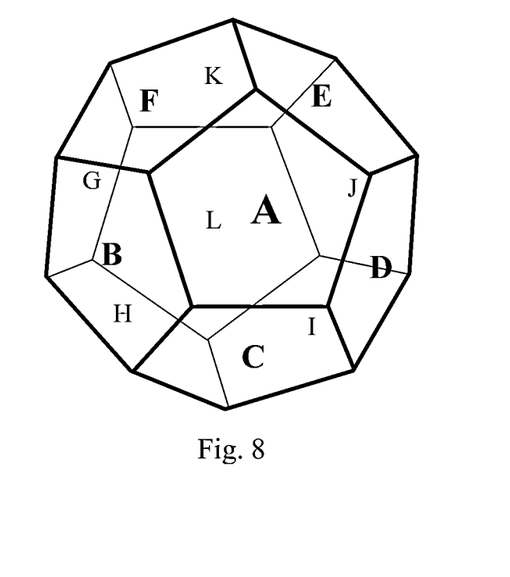
FIG. 8 is a schematic diagram of a dodecahedron structure provided in the yet another embodiment of the present disclosure.

In another application scenario of the present embodiment, the multiple-face structure is a dodecahedron. Referring to FIG. 8, the description is made by taking twelve interfaces as an example. The first level is the main interface A. Sub-interfaces of the second level include an interface B, an interface C, an interface D, an interface E and an interface F, and these five interfaces are all sub-interfaces of the interface A. Sub-interfaces of the third level include five sub-interfaces, in which an interface G is a sub-interface of the interface B, an interface H is a sub-interface of the interface C, an interface I is a sub-interface of the interface D, an interface J is a sub-interface of the interface E, and an interface K is a sub-interface of the interface F. There is one sub-interface in the fourth level, that is, an interface L, and the interface L is a sub-interface of the interface K. As shown in FIG. 8, a dodecahedron structure can be obtained by constructing a multiple-face structure according to the above logic relationship, the top face is the main interface A, the bottom face is the sub-interface L of the fourth level, and the side faces are the remaining respective sub-interfaces.

Figure 9:
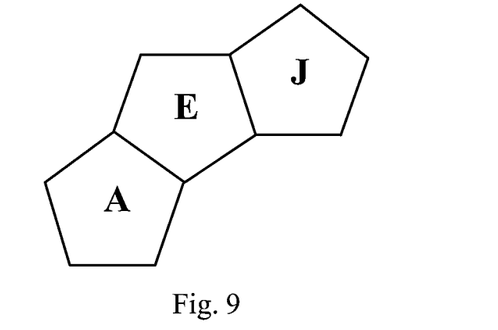
FIG. 9 is a schematic diagram of unfolding of the dodecahedron structure shown in FIG. 8.

FIG. 9 is a schematic plane view of the dodecahedron of FIG. 8 after being unfolded. After the function of the sub-interface J is triggered in the dodecahedron structure shown in FIG. 8, respective interfaces (every interface) from the sub-interface J to the main interface A are presented together, including the interface of the first level, that is, the main interface A, an interface of the second level, that is, the sub-interface E of the main interface A, and an interface of the third level, that is, the sub-interface J of the sub-interface E. Thus, three interfaces in total are presented; thereby an effect of simultaneously presenting multiple interfaces is achieved.

It should be noted that, as described above, the multiple-face structure in the present disclosure is not limited to a closed multiple-face structure and may further be a non-closed multiple-face structure. For example, in the example shown in FIG. 6, if there is no sub-interface F, the multiple-face structure in the example of FIG. 6 can be a five-face structure having an opening, that is, a structure obtained after removing one face from a hexahedron. In the example shown in FIG. 8, if there is no sub-interface J, the multiple-face structure in the example of FIG. 8 can be an eleventh-face structure having an opening.

At step 306, a closing hot region is presented around a sub-interface of an end level, and a certain sub-interface is animatedly closed when the closing hot region of the certain sub-interface is triggered.

In the present embodiment, the position of the closing hot region can be set as needed, for example on the right, top, bottom, or the like, of the sub-interface of the end level, which is not limited specifically by the present disclosure. The specific implementation of the animatedly closing is not limited either. For example, a sub-interface being closed can be presented with the effect of appearing from near to far, from big to small, from strong to weak, or the like. Between a sub-interface being closed and an interface being presented, an effect can be presented that two adjacent faces of a polyhedron are folded to an extent that only the interface being presented is left, or the like. This is not limited specifically by the present disclosure.

Figure 10:
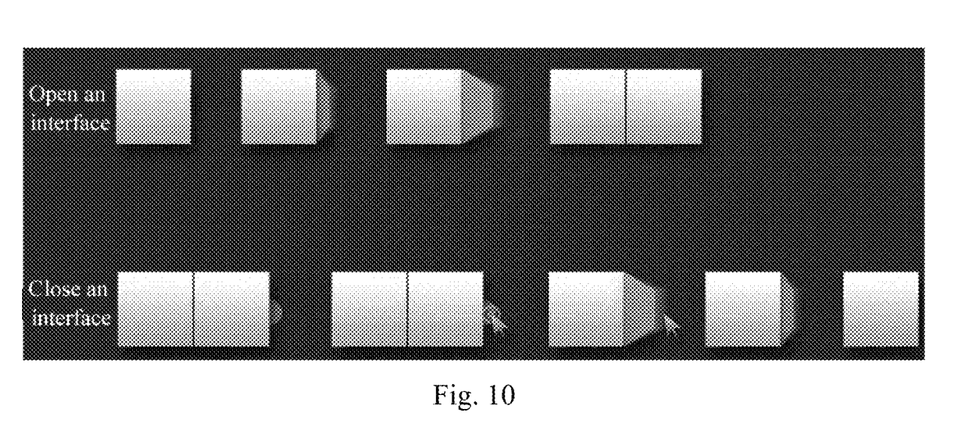
FIG. 10 is a schematic diagram of an animated presentation of interfaces provided in the yet another embodiment of the present disclosure.

FIG. 10 is one schematic diagram for animatedly opening and animatedly closing interfaces in the present embodiment. In the figure, on the top is a schematic diagram for opening interfaces, in which one main interface is opened first, and, when the function of a certain sub-interface is triggered, the certain sub-interface is opened slowly on the right side of the main interface and is presented in an effect that one face of a cube is opened from the right, and the sub-interface is becoming bigger from small gradually and finally becomes as big as the main interface. On the bottom of the figure is a schematic diagram for closing interfaces, in which two interfaces have been opened, and on the left is the main interface while on the right is a sub-interface. A semicircular button (a closing hot area) is displayed to the right of the sub-interface. When a user clicks the button, the closing of the sub-interface is triggered, and the sub-interface becomes smaller from big gradually and is presented in an effect that one side face of the cube is folded to back until the sub-interface disappears completely. Such a way of animatedly opening and animatedly closing interfaces highlights the association between interfaces more, and interactive actions will not appear too abrupt, which is closer and more easily accepted by users.

The above method provided in the present embodiment determines a logic relationship between a main interface to be presented and respective sub-interfaces according to functionality beforehand, constructs a multiple-face structure according to the logic relationship, presents the main interface of the multiple-face structure first when presenting the interfaces, and after detecting that function of one sub-interface is triggered, determines every sub-interface from the one sub-interface to the main interface according to the logic relationship in the multiple-face structure and presents the determined every sub-interface. Therefore, an effect of the associated presentation of multiple interfaces is achieved, and, the logical association between respective interfaces is reflected, which is more intuitive and can satisfy the requirement of a multiple-task scenario. For a scenario of parallel tasks, there is no need to switch function menus frequently; thereby the complexity of interface operations is reduced greatly, the effects of interface presentation and the interface utilization are improved, and the usability is enhanced.

(Fourth Embodiment)

Figure 11:
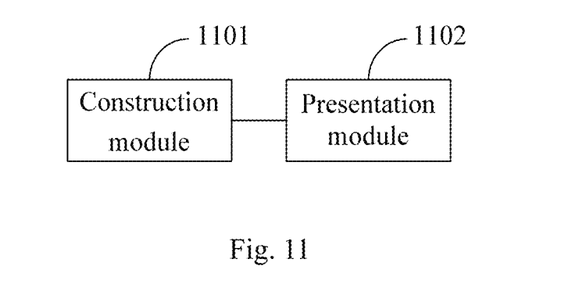
FIG. 11 is a structural diagram of an apparatus for interface presentation provided in a further embodiment of the present disclosure.

Referring to FIG. 11, the present embodiment provides an apparatus for interface presentation which includes a construction module 1101 configured to determine a logic relationship between a main interface to be presented and respective sub-interfaces according to functionality, and to construct a multiple-face structure according to the logic relationship, wherein each face of the multiple-face structure corresponds to an interface, and, when the interface has a sub-interface, the interface is adjacent to each sub-interface thereof; and a presentation module 1102 configured to present the main interface in the multiple-face structure, and to determining, after detecting that function of one sub-interface is triggered, every sub-interface from the one sub-interface to the main interface according to the logic relationship in the multiple-face structure and present the every sub-interface.

The presentation module 1102 is further configured to present the every sub-interface level animatedly by level according to an adjacency order of interfaces in the multiple-face structure, by starting from a first sub-interface adjacent to the main interface.

The adjacency order refers to the adjacency order between respective faces in the multiple-face structure. The specific way of the animatedly presenting is not limited. For example, a sub-interface being opened can be presented with the effect of appearing from far to near, from small to big, from weak to strong, or the like. Between a sub-interface being opened and an interface having been opened, an effect can be presented that two adjacent faces of the polyhedron are opened into one plane to be presented in a tiled manner, or the like. This is not limited by the present disclosure.

Further, the presentation module 1102 is further configured to present a closing hot region around a sub-interface of an end level, and to close a certain sub-interface animatedly when the closing hot region of the certain sub-interface is triggered.

In the present embodiment, the position of the closing hot region can be set as needed, for example, on the right, top, bottom, or the like of the sub-interface of the end level, which is not limited specifically by the present disclosure. The specific implementation of the animatedly closing is not limited either. For example, a sub-interface being closed can be presented with the effect of appearing from near to far, from big to small, from strong to weak, or the like. Between a sub-interface being closed and an interface being presented, an effect can be presented that two adjacent faces of a polyhedron are folded to an extent that only the interface being presented is left, or the like. This is not limited specifically by the present disclosure.

In the present embodiment, the presentation module 1102 is further configured to detect that the function of a sub-interface B of a certain sub-interface A among the presented every sub-interface is triggered, and then present the sub-interface B beside the sub-interface A according to the adjacency order of interfaces of the multiple-face structure.

In the present embodiment, the multiple-face structure includes a regular hexahedron or a polyhedron with more faces than a regular hexahedron.

In the present embodiment, the presentation module 1102 includes at least one of a first detection unit configured to detect that the function of a certain sub-interface is triggered on the main interface; a second detection unit configured to detect that the function of a certain sub-interface is triggered on a tray region; a third detection unit configured to detect that the function of a certain sub-interface is triggered in a right key menu; and a fourth detection unit configured to detect that the function of a certain sub-interface is triggered in a message box.

Preferably, the main interface may maintain a function entry for a sub-interface, through which a corresponding sub-interface can be triggered. This way is more direct and easier to operate.

Of course, the present disclosure also provides other possible implementations. In one way, it can be detected on a tray region that the function of a certain sub-interface is triggered. The tray region refers to a taskbar notification region of the system. Generally, applications currently running in the system, the network connection, a volume control icon, the time and date, icons defined by the user himself and so on are displayed in the tray region. For notebook computers, tablet computers etc., the battery usage and so on may also be displayed. The specific ways of detecting whether the function of a certain sub-interface is triggered or not on the tray region is not limited. For example, it can be detected whether a click event, a mouse over event or the like occurs or not on a sub-interface icon. In another way, it can be detected whether the function of an interface is triggered or not in a right key menu (a tray menu). In a further way, it can also be detected whether the function of an interface is triggered or not in a message box. The message box refers to tips, which are usually displayed on the lower right corner of a screen to prompt some timely messages to the user.

The above apparatus provided in the present embodiment may perform the method provided in any one of the above method embodiments; the specific procedure thereof refers to the description in the method embodiments, and unnecessary details will not be given here.

The above apparatus provided in the present embodiment determines a logic relationship between a main interface to be presented and respective sub-interfaces according to functionality, constructs a multiple-face structure according to the logic relationship, presents the main interface of the multiple-face structure, and, after detecting that the function of one sub-interface is triggered, determines every sub-interface from the one sub-interface to the main interface according to the logic relationship in the multiple-face structure and presents the determined every sub-interface. Thus, an effect of the associated presentation of multiple interfaces is achieved, and the logical association between respective interfaces is reflected, which is more intuitive and can satisfy the requirement of a multiple-task scenario. For a scenario of parallel tasks, there is no need to switch function menus frequently; thereby the complexity of interface operations is reduced greatly, the effect of interface presentation and the interface utilization are improved, and the usability is enhanced.

(Fifth Embodiment)

Figure 12:
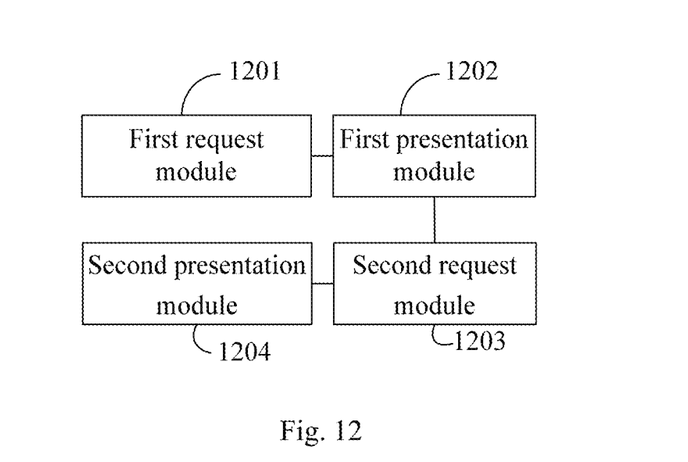
FIG. 12 is a structural diagram of an apparatus for user interface interaction provided in a further embodiment of the present disclosure.

Referring to FIG. 12, the present embodiment provides an apparatus for user interface interaction which includes a first request module 1201 configured to initiate a request to present one sub-interface when a main interface in a multiple-face structure has been represented; a first presentation module 1202 configured to determine every sub-interface from the one sub-interface to the main interface according to a logic relationship between the main interface and respective sub-interfaces and to present the every sub-interface; a second request module 1203 configured to initiate a request to present a sub-interface B of a certain sub-interface A; and a second presentation module 1204 configured to present the sub-interface B beside the sub-interface A according to an adjacency order of interfaces in the multiple-face structure.

The multiple-face structure is constructed in a manner of determining the logic relationship between the main interface and respective sub-interfaces, according to functionality, and constructing the multiple-face structure, according to the logic relationship, wherein each face of the multiple-face structure corresponds to an interface, and, when the interface has a sub-interface, the interface is adjacent to each sub-interface thereof.

In one implementation, the first presentation module 1202 is further configured to present the every sub-interface level animatedly by level according to the adjacency order of interfaces in the multiple-face structure, by starting from a first sub-interface adjacent to the main interface.

In another implementation, the first presentation module 1202 or the second presentation module 1204 is further configured to trigger a closing hot region presented around a sub-interface of an end level, and to close the sub-interface animatedly.

In a further implementation, the first request module 1201 or the second request module 1203 includes at least one of a first request unit configured to trigger a request for the function of a certain sub-interface on the main interface; a second request unit configured to trigger a request for the function of a certain sub-interface on a tray region; a third request unit configured to trigger a request for the function of a certain sub-interface in a right key menu; and a fourth request unit configured to trigger a request for the function of a certain sub-interface in a message box.

In the present embodiment, the multiple-face structure may include a regular hexahedron or a polyhedron with more faces than a regular hexahedron.

The above apparatus provided in the present embodiment may perform the method provided in any one of the above method embodiments, and the specific procedure thereof is referenced to the description in the method embodiments and unnecessary details will not be given here.

The above apparatus provided in the present embodiment initiates a request to present one sub-interface when a main interface in a multiple-face structure has been represented; determines every sub-interface from the one sub-interface to the main interface according to a logic relationship between the main interface and respective sub-interfaces, and presenting the every sub-interface; initiates a request to present a sub-interface B of a certain sub-interface A; and resents the sub-interface B beside the sub-interface A according to an adjacency order of interfaces of the multiple-face structure. An effect of the associated presentation of multiple interfaces is achieved, and the logical association between respective interfaces is reflected, which is more intuitive and can satisfy the requirement of a multiple-task scenario. For a scenario of parallel tasks, there is no need to switch function menus frequently; thereby the complexity of interface operations is reduced greatly, the effect of interface presentation and the interface utilization are improved, and the usability is enhanced.

It can be understood by those ordinarily skilled in the art that all or part of the steps for implementing the above embodiments may be completed by hardware or may be completed by a related hardware instructed by a program which may be stored in a computer readable storage medium, which may be a read only memory, a disk, a compact disc or the like. For example, the present disclosure may be implemented as a computer readable storage medium having stored thereon a computer program containing a program code which, when executed on a computing device, performs respective steps of the method for interface presentation as described above or respective steps of the method for user interface interaction as described above.

Figure 13:
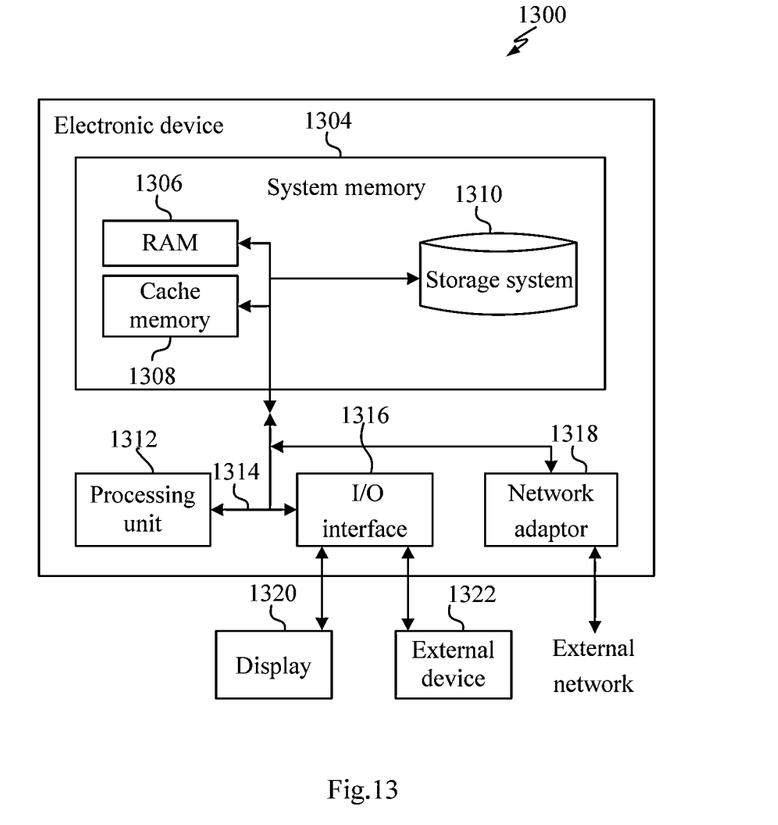
FIG. 13 is a structural schematic diagram showing an example electronic device which can be used to implement respective embodiments of the present disclosure.

FIG. 13 is a structural schematic diagram showing an example electronic device which can be used to implement respective embodiments of the present disclosure.

The electronic device 1300 shown in FIG. 13 is only an example and is not limiting of the functionality and the scope of use of embodiments of the disclosure. As shown in FIG. 13, the electronic device 1300 may be in a form of a general purpose computing device. Components of the electronic device 1300 may include, but are not limited to, one or more processors or processing units 1312, a system memory 1304, an I/O interface 1316, a network adapter 1318, a display 1320, and a bus 1314 that couples various components, and may be connected to an external device 1322.

The bus 1314 represents one or more of several types of bus structures. For example, such bus structures include, but are not limited to, Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and so on.

The electronic device 1300 typically includes a variety of computer system readable media. Such media may be any readable media that are accessible by the electronic device 1300, and include both volatile and non-volatile media, and both removable and non-removable media.

The system memory 1304 can include readable media in the form of volatile memory, such as random access memory (RAM) 1306 and/or cache memory 1308. The electronic device 1300 may further include other removable/non-removable, volatile/non-volatile storage media. For example, the storage system 1310 (typically called a "hard drive") can be provided for reading from and writing to a non-removable, non-volatile magnetic medium. Although not shown, a magnetic disk drive for reading from and writing to a removable, non-volatile magnetic disk (e.g., a "U disk"), and an optical disk drive for reading from or writing to a removable, non-volatile optical disk such as a CD-ROM, DVD-ROM or other optical media can be provided. In such instances, each drive can be connected to the bus 1314 by one or more data medium interfaces.

The system memory 1304 may include at least one program product having a set (for example, at least one) of program modules, which may be stored in the storage system 1310. The program module contains a computer executable program instruction. Such program modules are configured to perform functions of respective embodiments of the present disclosure by the processing units 1312 executing the program instruction therein. Such program modules include, but are not limited to, an operating system, one or more application programs, other program modules, and program data. Each of these examples of program modules or some combination thereof may include an implementation of a networking environment.

The electronic device 1300 may also communicate with one or more external devices 1322, such as a keyboard, a mouse, the display 1320, etc., and one or more devices that enable a user to interact with the electronic device 1300. Such communication can occur via the Input/Output (I/O) interface 1316. Further, the electronic device 1300 can also communicate with one or more networks such as a local area network (LAN), a general wide area network (WAN), and/or a public network (e.g., the Internet) via the network adapter 1318 such as a network card, modem, etc. As shown in FIG. 13, the I/O interface 1316 and the network adapter 1318 communicate with the other modules of the electronic device 1300 via the bus 1314. It should be understood that, although not shown, other hardware and/or software modules might be used in conjunction with the electronic device 1300. Such other hardware and/or software modules include, but are not limited to, microcode, device drivers, redundant processing units, external disk drive arrays, RAID systems, tape drives, and data archival storage systems, etc.

Respective units or steps in respective embodiments of the present disclosure may all be implemented by executing program modules having computer program instructions in the electronic device 1300.

The above are only preferable embodiments of the present disclosure and are not intended to limit the present disclosure. Any modification, equivalent replacement, improvement, etc made within the spirit and principle of the present disclosure should be contained within the protection scope of the present disclosure.

What is claimed is:

1. A method for interface presentation, comprising:
   determining a logic relationship among a first interface to be presented and a respective plurality of second interfaces and a respective plurality of third interfaces according to functionality, wherein the plurality of second interfaces are a lower level of the first interface and the plurality of third interfaces are a lower level of the plurality of second interfaces;
   constructing a multiple-face structure according to the logic relationship, each face of the multiple-face structure corresponding to an interface, and when the first interface has at least one second interface and at least one third interface, the first interface is adjacent to each second interface which the first interface has and the second interface is adjacent to each third interface which the corresponding second interface has;
   presenting the first interface in the multiple-face structure; and
   after detecting that a function for one triggered third interface of the plurality of third interfaces is triggered:
      determining a second interface on a path from the triggered third interface back to the first interface according to the logic relationship in the multiple-face structure; and
      only presenting the triggered third interface, the second interface on the path from the triggered third interface back to the first interface, and the first interface for users to choose any one of the interfaces to launch the function corresponding to the chosen interface.

2. The method according to claim 1, wherein said presenting the triggered third interface and the second interface comprises:
   animatedly presenting the triggered third interface and the second interface level by level according to an adjacency order of interfaces in the multiple-face structure.

3. The method of claim 1, further comprising:
   presenting a closing hot region around a certain third interface of an end level, and animatedly closing the certain third interface when the closing hot region of the certain third interface is triggered.

4. The method of claim 1, further comprising:
   after detecting that the function of the triggered third interface of a certain second interface among the presented plurality of second interfaces is triggered, presenting the third interface beside the second interface according to the adjacency order of interfaces in the multiple-face structure.

5. The method of claim 1, wherein said detecting that the function of the triggered third interface is triggered comprises at least one of:
   detecting that the function of the triggered third interface is triggered on the first interface;
   detecting that the function of the triggered third interface is triggered on a tray region;
   detecting that the function of the triggered third interface is triggered in a right key menu; or
   detecting that the function of the triggered third interface is triggered in a message box.

6. The method of claim 1, wherein the multiple-face structure includes a regular hexahedron or a polyhedron with more faces than a regular hexahedron.

7. A method for user interface interaction, comprising:
   presenting a multiple-face structure including a first interface, a plurality of second interfaces, and a plurality of third interfaces;
   initiating a request to present one triggered third interface of the plurality of third interfaces when a first interface in the multiple-face structure has been represented;
   determining a second interface of the plurality of second interfaces on a path from the triggered third interface back to the first interface according to a logic relationship in the multiple-face structure;
only presenting the triggered third interface, the second interface on the path from the triggered third interface back to the first interface, and the first interface;
presenting the triggered third interface beside the second interface according to an adjacency order of interfaces of the multiple face structure for users to choose any one of the interfaces to launch the function corresponding to the chosen interface;
the multiple-face structure being constructed in a manner of:
determining the logic relationship among the first interface and the respective plurality of second interfaces and the respective plurality of third interfaces according to functionality, wherein the plurality of second interfaces are a lower level of the first interface and the plurality of third interfaces are a lower level of the second interface; and
constructing the multiple-face structure according to the logic relationship, wherein, each face of the multiple-face structure corresponds to an interface, and when the first interface has at least one second interface and at least one third interface, the first interface is adjacent to each second interface which the first interface has and the second interface is adjacent to each third interface which the second interface has.

8. The method of claim 7, wherein said presenting the triggered third interface and the second interface comprises:
animatedly presenting the triggered third interface and the second interface level by level according to the adjacency order of interfaces in the multiple-face structure.

9. The method of claim 7, further comprising:
triggering a closing hot region presented around a third interface of an end level; and animatedly closing the third interface.

10. The method of claim 7, said initiating a request to present the one third interface comprises at least one of:
triggering a request for the function of the triggered third interface on the first interface;
triggering a request for the function of the triggered third interface on a tray region;
triggering a request for the function of the triggered third interface in a right key menu; or
triggering a request for the function of the triggered third interface in a message box.

11. An apparatus for interface presentation, comprising:
one or more processors;
a memory coupled with the one or more processors, the memory having stored thereon program code that when executed by the one or more processors, causes the one or more processors to perform:
a construction step of determining a logic relationship among a first interface to be presented and a respective plurality of second interfaces and a respective plurality of third interfaces according to functionality, wherein the plurality of second interfaces are a lower level of the first interface and the plurality of third interfaces are a lower level of the plurality of second interfaces, and to construct a multiple-face structure according to the logic relationship, each face of the multiple-face structure corresponding to one interface, and when the first interface has at least one second interface and at least one third interface, the first interface is adjacent to each second interface which the first interface has and the second interface is adjacent to each third interface which the second interface has; and a presentation step of presenting the first interface in the multiple-face structure, and after detecting that function of one triggered third interface is triggered;
determining a second interface on a path from the triggered third interface back to the first interface according to the logic relationship in the multiple-face structure; and
only present the triggered third interface, the second interface on the path from the triggered third interface back to the first interface, and the first interface for users to choose any one of the interfaces to launch the function corresponding to the chosen interface.

12. The apparatus of claim 11, wherein the presentation step includes:
animatedly presenting the triggered third interface and the second interface level by level according to an adjacency order of interfaces in the multiple-face structure.

13. The apparatus of claim 11, wherein the presentation step further includes:
presenting a closing hot region around a certain third interface of an end level, and to animatedly close the certain third interface when the closing hot region of the certain third interface is triggered.

14. The apparatus of claim 11, wherein the presentation further includes:
after detecting that the function of the triggered third interface of a certain second interface among the presented plurality of second interfaces is triggered, presenting the third interface beside the second interface according to the adjacency order of interfaces in the multiple-face structure.

15. The apparatus of claim 11, wherein the presentation step comprises at least one of:
a first detection step of detecting that the function of the triggered third interface is triggered on the first interface;
a second detection step of detecting that the function of the triggered third interface is triggered on a tray region;
a third detection step of detecting that the function of the triggered third interface is triggered in a right key menu; or
a fourth detection step of detecting that the function of the triggered third interface is triggered in a message box.

16. An apparatus for user interface interaction, comprising:
one or more processors;
a memory coupled with the one or more processors, the memory having stored thereon program code that when executed by the one or more processors, causes the one or more processors to perform:
a presenting step of presenting a multiple-face structure including a first interface, a plurality of second interfaces, and a plurality of third interfaces;
a first request step of initiating a request to present one triggered third interface of the plurality of third interfaces when a first interface in the multiple-face structure has been represented;
a first presentation step of determining a second interface of the plurality of second interfaces on a path from the triggered third interface back to the first interface according to a logic relationship in the multiple-face structure and to only present the triggered third interface, the second interface on the path from the triggered third interface back to the first interface, and the first interface;

a second presentation step of presenting the triggered third interface beside the second interface according to an adjacency order of interfaces in the multiple-face structure for users to choose any one of the interfaces to launch the function corresponding to the chosen interface;

the multiple-face structure being constructed in a manner of:

determining the logic relationship among the first interface and the respective plurality of second interfaces and the respective plurality of third interface according to functionality, wherein the plurality of second interfaces are a lower level of the first interface and the plurality of third interfaces are a lower level of the second interface; and constructing the multiple-face structure according to the logic relationship, wherein, each face of the multiple-face structure corresponds to an interface, and when the first interface has at least one second interface and at least one third interface, the first interface is adjacent to each second interface which the first interface has and the second interface is adjacent to each third interface which the second interface has.

17. The apparatus of claim 16, wherein the first presentation includes:

animatedly presenting the triggered third interface and the second interface level by level according to the adjacency order of interfaces in the multiple-face structure.

18. The apparatus of claim 16, wherein the first presentation module or the second presentation step includes:

triggering a closing hot region presented around a third interface of an end level; and animatedly closing the third interface.

19. The apparatus of claim 16, wherein the first request step comprises at least one of:

a first request step of triggering a request for the function of the triggered third interface on the first interface;

a second request step of triggering a request for the function of the triggered third interface on a tray region;

a third request step of triggering a request for the function of the triggered third interface in a right key menu; and a fourth request step of triggering a request for the function of the triggered third interface in a message box.

20. A non-transitory computer readable storage medium having stored thereon a computer program containing a program code which, when executed on a computing device, performs respective steps of the method for interface presentation according to claim 1.

21. A non-transitory computer readable storage medium having stored thereon a computer program containing a program code which, when executed on a computing device, performs respective steps of the method for user interface interaction according to claim 7.

* * * * *